United States Patent
Imaizumi

(10) Patent No.: US 8,363,977 B2
(45) Date of Patent: Jan. 29, 2013

(54) DEFORMATION MEASUREMENT METHOD AND APPARATUS

(75) Inventor: Yo Imaizumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 13/090,163

(22) Filed: Apr. 19, 2011

(65) Prior Publication Data

US 2011/0268312 A1    Nov. 3, 2011

(30) Foreign Application Priority Data

Apr. 28, 2010   (WO) ................. PCT/JP2010/057584

(51) Int. Cl.
*G06K 9/40* (2006.01)
(52) U.S. Cl. ........ 382/274; 382/275; 382/100; 356/497; 356/511; 356/512
(58) Field of Classification Search .................. 382/100, 382/274, 275; 356/497, 511, 512
See application file for complete search history.

(56) References Cited

U.S. PATENT DOCUMENTS

| | | | | |
|---|---|---|---|---|
| 5,703,680 A * | 12/1997 | Dunn et al. | ................. | 356/35.5 |
| 5,760,902 A * | 6/1998 | Brody | ............................ | 356/458 |
| 6,532,073 B2 * | 3/2003 | Ge | ................................ | 356/512 |
| 6,778,281 B2 * | 8/2004 | Ge | ................................ | 356/511 |
| 7,092,104 B2 * | 8/2006 | Hizuka et al. | ................. | 356/512 |
| 7,978,338 B2 * | 7/2011 | De Groot et al. | ............. | 356/497 |
| 8,120,781 B2 * | 2/2012 | Liesener et al. | .............. | 356/497 |

FOREIGN PATENT DOCUMENTS

| | | |
|---|---|---|
| JP | 7-046045 A | 2/1995 |
| JP | 11-304417 A | 11/1999 |
| JP | 2003-139515 A | 5/2003 |
| JP | 2004-109075 A | 4/2004 |
| JP | 2006-275868 A | 10/2006 |
| JP | 2007-071584 A | 3/2007 |
| JP | 2007-240465 A | 9/2007 |

\* cited by examiner

*Primary Examiner* — Tom Y Lu
(74) *Attorney, Agent, or Firm* — Canon U.S.A., Inc. IP Division

(57) ABSTRACT

There is a situation in that, although a speckle interference optical system is effective for clarification of a process of deformation of a specimen, resolution is insufficient, and execution of a phase shift method for improving the resolution involves a costly apparatus.

A phase shift image for an initial fringe pattern is acquired, and a phase variation between phase information on an initial image and a next image is derived by a phase shift method. After that, a phase shift image for the next image is computed by calculation based on the acquired information.

4 Claims, 3 Drawing Sheets

DEFORMATION MEASUREMENT METHOD AND APPARATUS

TECHNICAL FIELD

The present invention relates to a method of measuring the amount of deformation of an object in a noncontact manner. In particular, it relates to a deformation measurement method of measuring in a noncontact manner the amount of minute deformation.

BACKGROUND ART

One known traditional example of a technique for measuring the amount of minute deformation caused by, for example, pressing or heating an industrial product is speckle interferometry. FIG. 5 illustrates a speckle interferometry instrument described in Patent Literature 1. First, laser light ejected from a He—Ne laser light source 2 is reflected by a mirror 3, the reflected light is incident on a half mirror 6, and the light is separated to a direction in which a reference object 7 is disposed and a direction in which a specimen 3 is disposed. Light reflected off the surface of the specimen 8 (measurement light) passes through the half mirror 6 again and reaches a camera 11, whereas light reflected off the surface of the reference object 7 (reference light) is reflected by the half mirror 6 to the direction of the camera 11 and reaches the camera 11. The camera 11 can capture an image of an interference pattern having spots (speckles) caused by interference between the object light and reference light. When this speckle interference image is captured again after a certain period of time and the difference from the original speckle interference pattern image is determined, the extent of deformation occurring in the specimen 8 can be measured.

A technique of capturing an image of a grid pattern or moiré pattern projected by, for example, a projector onto a specimen and measuring the shape and deformation of the specimen from modulation of the pattern and a technique of measuring the shape and deformation of a specimen with high precision from an interference pattern using optical interference are commonly known.

These measurement techniques perform processing called sub-fringe analysis of analyzing the phase of an oscillatory waveform as which lightness and darkness of a captured image of a pattern is regarded. Because the phase of a waveform and the dimensions of the shape of a specimen are in proportion to each other, high-resolution shape measurement and deformation measurement can be achieved by detection of the phase from the captured image of the pattern with high precision.

For the above-described sub-fringe analysis method, the phase shift method is commonly known as a technique capable of analyzing a specimen with high resolution. The phase shift method is a method of first emitting original pattern light to a specimen, capturing its image, then capturing a plurality of images provided by emitting pattern light having the known phase variation, and calculating the phase of the image resulting from the original pattern light from a change in light and dark value in each point of the images.

At this time, in addition to the phase, amplitude and a background component are contained in the captured image as an unknown component. Therefore, to calculate phase information, it is necessary to simultaneously acquire at least two or more different phase shift images, in addition to an original image. Thus, a technique of disposing optical paths in which each of measurement light and reference light is separated to three portions, producing a phase difference by providing the optical path of the reference light with a refractive medium, and simultaneously acquiring a plurality of phase shift images is known (Patent Literature 2).

Citation List

Patent Literature

PTL 1 Japanese Patent Publication No. 7-46045

PTL 2 Japanese Patent Laid-Open No. 11-304417

However, for the invention described in Cited Literature 1, the amount of deformation is computed from a simple difference between intensity distributions of two speckle interference pattern images. Therefore, it is sufficient for the order of from micrometers to millimeters, but a situation exists in that resolution is insufficient for measurement of the amount of significantly minute deformation, such as one in the order of nanometers. Thus, clarification of a process of deformation of a specimen is limited.

For the technique described in Cited Literature 2, although resolution is sufficient, a plurality of optical paths for use in capturing a phase shift image for each lapse of time is required. Thus, the apparatus tends to be large and costly.

It is an object of the present invention to provide a deformation measurement method capable of measuring the amount of deformation of a specimen with high resolution at low cost without having to complicate an apparatus.

SUMMARY OF INVENTION

The invention according to the present application is a method of measuring an amount of deformation of a specimen employing a phase variation of an interference pattern caused by emitting light to the specimen. The method includes acquiring a first interference pattern image and two or more phase shift images having different amounts of phase shift for the first interference pattern image using an image pickup unit, acquiring a second interference pattern image after a lapse of a predetermined period of time using the image pickup unit, computing a phase of the first interference pattern image from the first interference pattern image and the two or more phase shift images, computing a first phase variation of an interference pattern image occurring during the predetermined period of time from the first interference pattern image, the phase shift images for the first interference pattern image, and the second interference pattern image using a calculation unit, computing a phase shift image for the second interference pattern image based on the phase of the first interference pattern image, the phase variation, and the amounts of phase shift, and computing the amount of deformation of the specimen based on the second interference pattern image and the two or more computed phase shift images for the second interference pattern image.

Further features of the present invention will become apparent from the following description of exemplary embodiments with reference to the attached drawings.

DESCRIPTION OF EMBODIMENTS

Embodiment

A concrete embodiment of the present invention is described below. In the embodiment of the present invention, "deformation" is a synonym for "displacement" because the amount of deformation is determined in the displacement on each pixel. Although the present invention is also applicable to a Fizeau interferometer, which uses reflection light from a reference surface as reference light, an optical system that does not use reference light is described below as an example for the sake of description.

Figure 2:
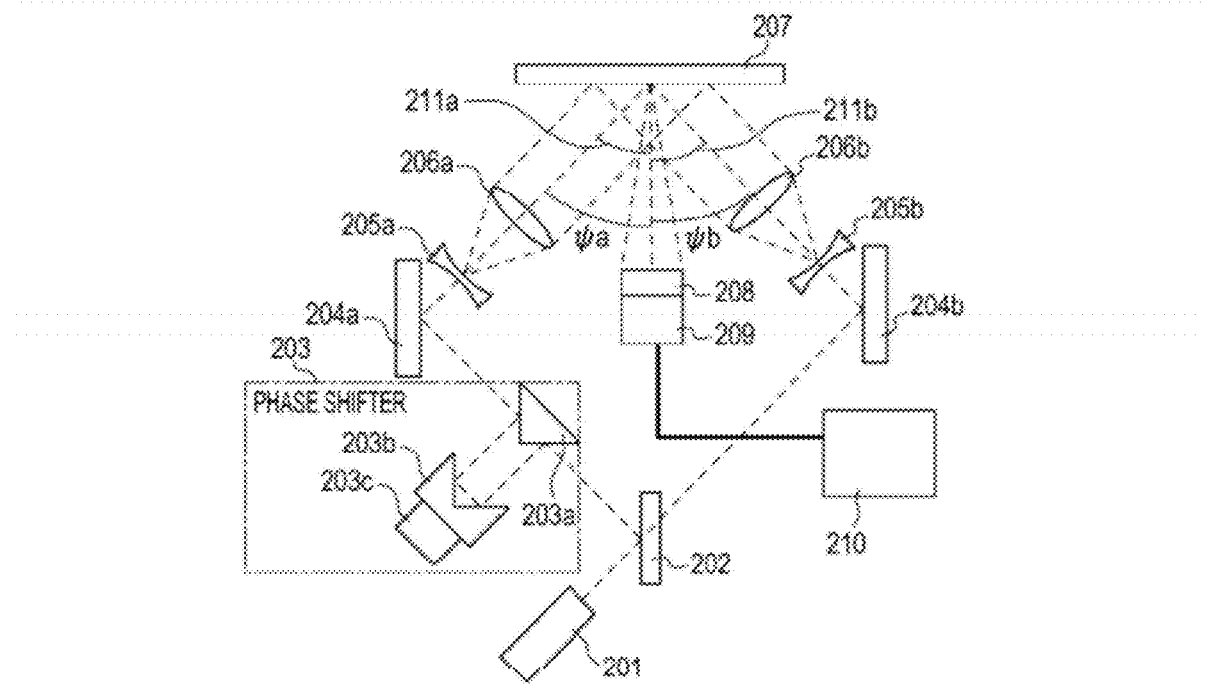
FIG. 2 is a diagram of a speckle interference optical system according to the embodiment of the present invention.

First, a configuration of a speckle interference optical system illustrated in FIG. 2 is described in detail. The speckle interference optical system in the present embodiment uses a laser light source 201 as a light source. In the present embodiment, a He—Ne laser light source having a wavelength of 632.8 nm is used. Laser light ejected from the laser light source 201 is separated into two light beams by a beam splitter 202. The optical length of a first separated light beam is made to be variable, and it enters a phase shifter 203 for achieving phase shifting.

The phase shifter 203 includes a triangle mirror 203a, a corner cube mirror 203b, and a lead zirconate titanate (PZT) actuator 203c. The triangle mirror 203a includes two mirror surfaces perpendicular to each other of a right isosceles triangular prism. The optical axis of a light beam incident on a mirror surface of the triangle mirror 203a is bent 90°, and the light beam is incident on the corner cube mirror 203b. The corner cube mirror 203b has a configuration in which two mirrors are arranged at 90° and reflects incident light to the opposite direction while translating it. The light beam reflected by the corner cube mirror 203b is incident on the triangle mirror 203a again, its optical axis is bent 90°, and it is ejected. The PZT actuator 203c is connected to the back of the corner cube mirror 203b, thus allowing the position of the corner cube mirror 203b to be minutely moved. The optical length in the phase shifter 203 can be changed in response to the amount of minute movement, and when two light beams are made to interfere with each other, phase shifting can be performed using a known amount of phase shift. The phase shifter is not limited to the one described in the present embodiment. For example, a type of a phase shifter using a transparent substrate rotatably arranged in a plane containing an optical path and intersecting the optical path and changing the phase of light passing through the transparent substrate by a rotation angle of the transparent substrate may also be used. A desired phase shifter may also be used as long as it can provide passing light with a known amount of phase shift.

Of two light beams separated by the beam splitter 202, a first light beam is incident on a reflector 204a through the phase shifter 203 and is reflected by it. After that, it enters a concave lens 205a and is changed into a spherical wave, and thereafter, it is made into a collimated beam by a collimating lens 206a.

A second light beam passing through the beam splitter 202 reaches a reflector 204b, passes through a concave lens 205b, and is made into a collimated beam by a collimating lens 206b.

The above two collimated beams are emitted to a region to be measured of the surface of a specimen 207 fixed to a stage (not illustrated) so as to overlap each other. The stage has a publicly known tensile testing mechanism that holds and supports the specimen so as to be able to apply a tensile stress thereto in its longitudinal direction and is able to pull on the specimen 207 to any length.

Two collimated beams are emitted at an emission angle $\psi_a$ of 45° and an emission angle $\psi_b$ of 45° with respect to the normal to the surface of the specimen 207.

For the speckle interference optical system according to the present embodiment, the magnitude of the amount of deformation for one period of an interference intensity change is determined in accordance with emission angles of two beams. The magnitude $d_\lambda$ of the amount of deformation for one period can be expressed by Expression 1 using incident angles $\psi_a$ and $\psi_b$ of two beams emitted to a specimen.

$$d_\lambda = \frac{\lambda}{2\sin\left(\frac{\psi_a + \psi_b}{2}\right)} \qquad \text{Expression 1}$$

In Expression 1, $\lambda$ denotes the wavelength of used laser light, and it is 632.8 nm in the present embodiment. Because the emission angles $\psi_a$ and $\psi_b$ are both 45°, the magnitude $d_\lambda$ of the amount of deformation for one period of an interference intensity change in the present embodiment is 447.5 nm.

Figure 4:
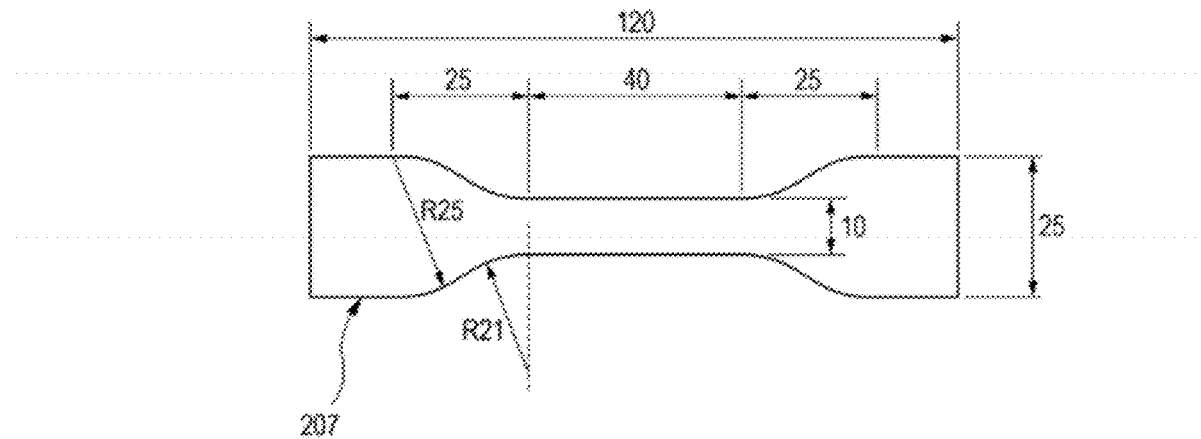
FIG. 4 illustrates a specimen used in the embodiment of the present invention.
Figure 5:
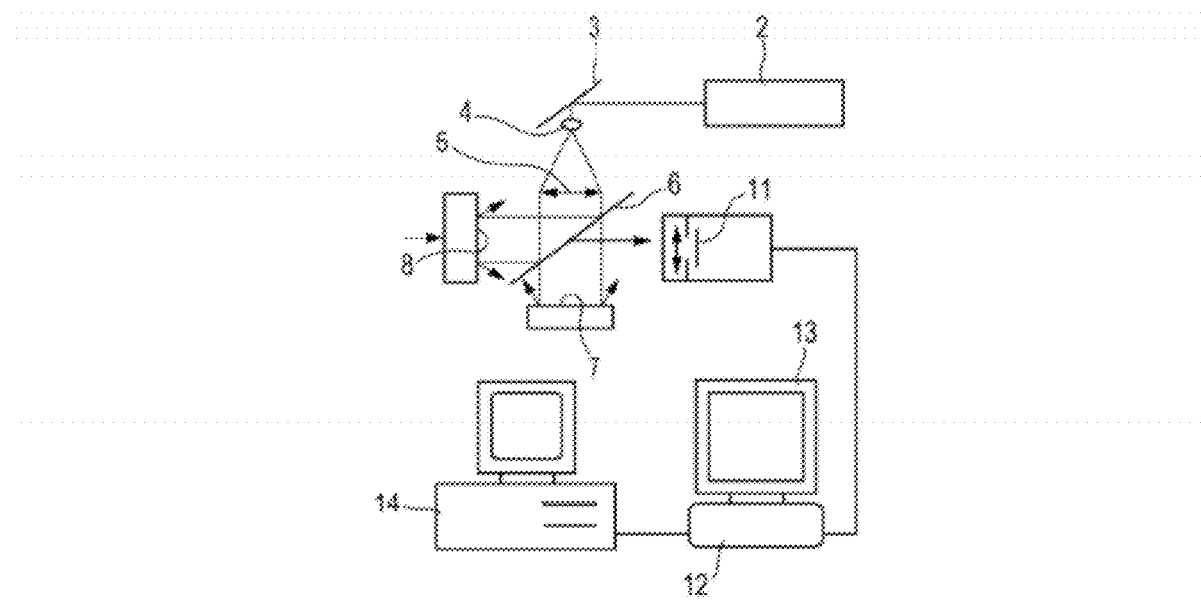
FIG. 5 is a diagram of a traditional speckle interference optical system.

For the present embodiment, a specimen used in the present embodiment is illustrated in FIG. 4. As the specimen 207, an object in which a plate made of stainless steel SUS304 and having dimensions of 120 mm in its longitudinal direction and 0.01 mm in thickness is processed into the shape of dumbbell No. 1 (JIS standards) is used. The surface state of the specimen 207 is optically rough.

When the above-described two collimated beams are emitted to a specimen fixed to a stage (not illustrated), the emitted two collimated beams scatter and interfere on the surface of the specimen 207 and a speckle interference pattern occurs. The occurring speckle interference pattern is guided to the device surface of an image pickup device 209 by an imaging lens 208, and it is recorded as a digital image by the image pickup device 209. For the present embodiment, a charge-coupled device (CCD) camera is used as the image pickup device 209. As the CCD camera, one that has the number of pixels of 640H×480V and can capture a movie at a maximum speed of 30 frames per second is used.

Information on a digital image captured by the image pickup device 209 is stored in a memory of a calculator 210. Deformation measurement is conducted by performing data processing using the digital image information stored in the calculator 210.

Chronological deformation measurement for the specimen 207 is conducted by the use of the above-described speckle interference optical system. For the present embodiment, deformation measurement when the specimen 207 is stretched by tension to 100 µm at a speed of 10 µm/s is conducted.

Figure 1:
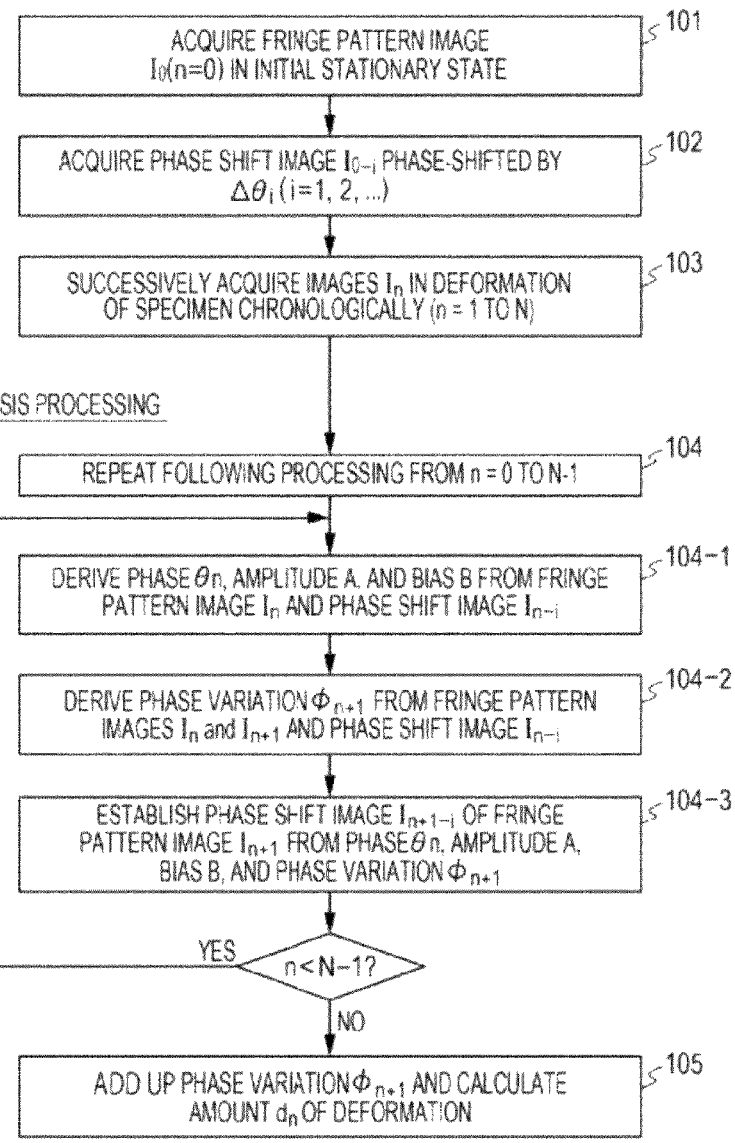
FIG. 1 is a flow diagram of phase calculation according to an embodiment of the present invention.

A method of computing the amount of deformation of a specimen from an acquired image of a speckle interference pattern and its phase shift image is described below in sequence with reference to the flowchart illustrated in FIG. 1.

Step 101, Step 102

First, an image of a speckle interference pattern in a stationary state and a phase shift image corresponding to the speckle interference pattern are captured. For the present embodiment, three phase shift images are acquired. Known mutually different amounts of phase shift are $\pi/2$, $\pi$, and $3\pi/2$.

To achieve these amounts of phase shift, the PZT actuator 203c of the phase shifter 203 in FIG. 2 is moved from the initial state by 79.1 nm, 158.2 nm, and 237.3 nm, and phase shift images are captured. In the case of a phase shifter of the present embodiment, because the optical length for incoming and outgoing routes can be changed by displacing the corner cube mirror 203*b* with respect to the triangle mirror 203*a*, an amount of displacement of ½ can be provided with respect to a desired amount of phase shift.

Any amount of phase shift can be set. To determine three unknown numbers of phase $\theta_0$, amplitude A, and bias B in the following steps, in addition to a speckle interference pattern image, it is necessary to acquire two more phase shift images thereof at minimum. For the present embodiment, for the sake of simplification of operation on a calculator, three images are captured.

Step 103

Next, an image of a speckle interference pattern in a process of deformation is captured. For an image capture period, images are captured at a rate of a single image per 0.5 seconds. Because the specimen 207 being a dumbbell-shaped plate is stretched by a tension testing machine at a speed of 10 μm/s to 100 μm in the direction x in FIG. 3, if an initial image is n=0, a total of 21 speckle interference pattern images I are acquired until n=20.

(x, y) attached to an intensity distribution I of an interference pattern image indicates a coordinate system in an image pickup area of the image pickup device 209. For indices attached to I, a left index indicates a time, "0" indicates the start of measurement, and "1" indicates two seconds later, whereas a right index indicates a phase shift image, "0" indicates a speckle interference pattern image, and "1" and subsequent numbers indicate phase shift images.

For example, in the present embodiment, $I_{0-1}$ (x, y) indicates a phase shift image having an amount of phase shift of π/2 with respect to a speckle interference pattern at the start of measurement, and $I_{1-0}$ (x, y) indicates a speckle interference pattern acquired two seconds later. For the present embodiment, because three phase shift images are acquired for a single speckle interference pattern, 1, 2, and 3 are used as the right affix.

Step 104-1

A method of computing the phase $\theta_0$, amplitude A, and bias B of a speckle interference pattern $I_0$ using captured phase shift images is described. The captured phase shift images have amounts of phase shift of π/2, π, and 3π/2, respectively, and can be expressed as Expression 2.

$$I_{0-0}(x,y)=A(x,y)\cos\theta_0(x,y)+B(x,y)$$

$$I_{0-1}(x,y)=A(x,y)\cos(\theta_0(x,y)+\pi/2)+B(x,y)$$

$$I_{0-2}(x,y)=A(x,y)\cos(\theta_0(x,y)+\pi)+B(x,y)$$

$$I_{0-3}(x,y)=A(x,y)\cos(\theta_0(x,y)+3\pi/2)+B(x,y) \quad \text{Expression 2}$$

The values of the phase $\theta_0$, amplitude A, and bias B can be computed by solving Expression 2 as simultaneous equations.

Step 104-2

Next, about step 104-2, a method of computing a phase variation φ is described.

For the present embodiment, approximation is made by acquiring an ensemble average in an adjacent 7×7 region having the coordinates (x, y) as its center.

A phase variation $\phi_1$ (=$\theta_1-\theta_0$) occurring in two seconds from the start of measurement to next image capture is computed based on intensity distributions of a speckle interference pattern image captured by the image pickup device 209 two seconds later, a speckle interference pattern image already acquired at the start of measurement, and its phase shift image.

$\phi_1$ can be determined as in Expression 3. In Expression 3, the symbols (x, y) to be attached to I are omitted.

$$\phi_1(x, y) = \arctan\frac{(I_{1-0} - I_{0-1})^2 - (I_{1-0} - I_{0-3})^2}{(I_{1-0} - I_{0-0})^2 - (I_{1-0} - I_{0-2})^2} \quad \text{Expression 3}$$

Step 104-3

Phase shift images $I_{1-1}$, $I_{1-2}$, and $I_{1-3}$ for an interference pattern image $I_{1-0}$ at a next time can be computed on the calculator using the phase $\theta_0$, amplitude A, bias B, and phase variation $\phi_1$ determined by the preceding steps. A phase shift image established on the calculator can be expressed as Expression 4 below. $\theta_1$ indicates a phase of a speckle interference pattern image $I_{1-0}$ captured two seconds later. A phase shift image captured two seconds later can be expressed as the following expression.

$$I_{1-1}(x,y)=A(x,y)\cos(\theta_1(x,y)+\pi/2)+B(x,y)$$

$$I_{1-2}(x,y)=A(x,y)\cos(\theta_1(x,y)+\pi)+B(x,y)$$

$$I_{1-3}(x,y)=A(x,y)\cos(\theta_1(x,y)+3\pi/2)+B(x,y) \quad \text{Expression 4}$$

That is, a phase of a phase shift image captured two seconds later is the value in which each of known amounts of phase shift (π/2, π, 3π/2) is added to $\theta_1$ (=$\theta_0+\phi_1$) computed using the phase $\theta_0$ of a speckle interference pattern at the start of measurement and the phase variation $\phi_1$, and this can be computed or the calculator. Accordingly, for the present invention, it is not necessary to capture a phase shift image in a process of deformation of the specimen 207.

From the above, for the present invention, if a phase shift image of a specimen having a known amount of phase shift is acquired at the start of measurement, a phase shift image can be acquired at any time by calculation at low cost without subsequent image capture.

The above-described step 104 can be repeated, phase variations for all image capture intervals can be computed, and the amount of deformation of a specimen for each elapsed time can be computed from the sequentially acquired phase variations. Because a phase shift image can be acquired for each elapsed time, the amount of deformation can be measured at each time with high resolution.

Step 105

A total amount $d_n$ of deformation can also be deprived by adding up sequentially acquired phase variations. For the present embodiment, the amount of deformation for one period of 2π of a phase is 447.5 nm, and a total amount $d_n$ of deformation (nanometers) can be expressed as Expression 5 below.

$$d_n = 447.5 \sum_{n=1}^{k} \phi_n \quad \text{Expression 5}$$

Figure 3:
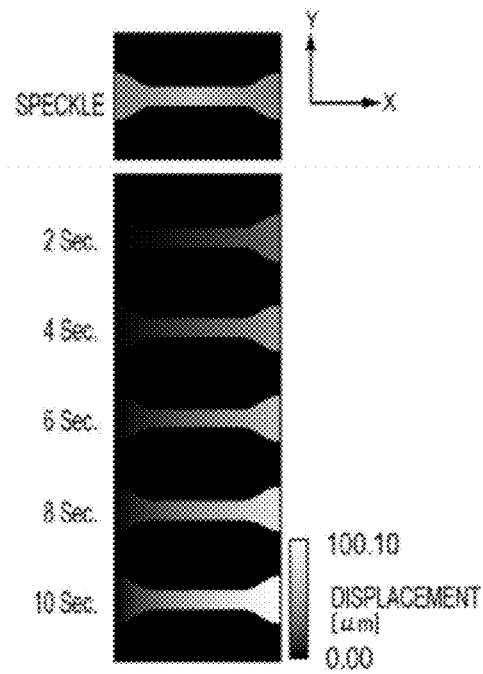
FIG. 3 is a contour diagram of a result of deformation measurement according to the embodiment of the present invention.

A result of measurement of the amount of deformation of a sample through the above-described steps is illustrated in FIG. 3. It has been confirmed that an increasing state of the amount of deformation over time can be captured. A final total amount of deformation is 100.10 μm. A total amount of deformation of the same specimen measured using a heterodyne displacement shape is 100.13 μm. Therefore, a likely match has been confirmed.

The present invention is not limited to the above embodiment, and various changes and alterations can be made without departing from the spirit and scope of the present invention. Accordingly, to make the scope of the present invention public, the following claims are appended.

With the above-described present invention, if a phase shift image of a specimen having a known amount of phase shift is acquired at the start of measurement, a phase shift image can be acquired at any time by calculation without subsequent image capture. Therefore, measurement of deformation with high resolution at low cost can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2010/057584, filed Apr. 28, 2010, which is hereby incorporated by reference herein in its entirety.

What is claimed is:

1. A method of measuring an amount of deformation of a specimen employing a phase variation of an interference pattern caused by emitting light to the specimen, the method comprising:
    acquiring a first interference pattern image and two or more phase shift images having different amounts of phase shift for the first interference pattern image using an image pickup unit;
    acquiring a second interference pattern image after a lapse of a predetermined period of time using the image pickup unit;
    computing a phase of the first interference pattern image from the first interference pattern image and the two or more phase shift images;
    computing a first phase variation of an interference pattern image occurring during the predetermined period of time from the first interference pattern image, the phase shift images for the first interference pattern image, and the second interference pattern image using a calculation unit;
    computing a phase shift image for the second interference pattern image based on the phase of the first interference pattern image, the phase variation, and the amounts of phase shift; and
    computing the amount of deformation of the specimen based on the second interference pattern image and the two or more computed phase shift images for the second interference pattern image.

2. The method according to claim 1, wherein the computing two or more phase shift images is performed on interference patterns acquired at a plurality of times, and a total amount of deformation of the specimen from a specific time is computed based on a cumulative total of the acquired phase variations.

3. An apparatus for measuring an amount of deformation of a specimen employing a phase variation of an interference pattern caused by emitting light to the specimen, the apparatus comprising:
    an image pickup unit configured to:
    acquire a first interference pattern image and two or more phase shift images having different amounts of phase shift for the first interference pattern image, and
    acquire a second interference pattern image after a lapse of a predetermined period of time; and
    a calculation unit configured to:
    compute a phase of the first interference pattern image from the first interference pattern image and the two or more phase shift images,
    compute a first phase change of an interference pattern image occurring during the predetermined period of time from the first interference pattern image, the phase shift images for the first interference pattern image, and the second interference pattern image,
    compute a phase shift image for the second interference pattern image based on the phase of the first interference pattern image, the phase variation, and the amounts of phase shift, and
    compute the amount of deformation of the specimen based on the second interference pattern image and the two or more computed phase shift images for the second interference pattern image.

4. The apparatus according to claim 3, wherein the computing two or more phase shift images is performed on interference patterns acquired at a plurality of times, and a total amount of deformation of the specimen from a specific time is computed based on a cumulative total of the acquired phase variations.

* * * * *